US 8,022,837 B2

(12) United States Patent  
Scheelke

(10) Patent No.: US 8,022,837 B2  
(45) Date of Patent: Sep. 20, 2011

(54) INFRARED SIGNAL DISTRIBUTION AND MANAGEMENT SYSTEM AND METHOD

(75) Inventor: Erik Scheelke, Cupertino, CA (US)

(73) Assignee: Resource Consortium Limited, Inc. (VG)

( * ) Notice: Subject to any disclaimer, the term of this patent is extended or adjusted under 35 U.S.C. 154(b) by 940 days.

(21) Appl. No.: 11/503,818

(22) Filed: Aug. 11, 2006

(65) Prior Publication Data

US 2006/0277580 A1    Dec. 7, 2006

Related U.S. Application Data

(63) Continuation-in-part of application No. 10/846,332, filed on May 14, 2004.

(60) Provisional application No. 60/470,768, filed on May 14, 2003.

(51) Int. Cl.
*G08C 19/00* (2006.01)

(52) U.S. Cl. ......... 340/825.69; 340/825.25; 340/825.72; 381/81

(58) Field of Classification Search ............. 340/825.69, 340/825.72, 825.25; 381/81
See application file for complete search history.

(56) References Cited

U.S. PATENT DOCUMENTS

| | | | |
|---|---|---|---|
| 5,193,208 A | | 3/1993 | Yokota et al. |
| 5,452,291 A | | 9/1995 | Eisenhandler et al. |
| 5,666,645 A | | 9/1997 | Thomas et al. |
| 5,682,206 A | | 10/1997 | Wehmeyer et al. |
| 5,808,760 A | * | 9/1998 | Gfeller ............................ 398/27 |
| 5,982,762 A | * | 11/1999 | Anzai et al. ................... 370/338 |
| 6,029,195 A | | 2/2000 | Herz |
| 6,037,933 A | | 3/2000 | Blonstein et al. |
| 6,177,931 B1 | | 1/2001 | Alexander et al. |
| 6,255,961 B1 | | 7/2001 | Van Ryzin et al. |
| 6,263,503 B1 | | 7/2001 | Margulis |
| 6,305,018 B1 | | 10/2001 | Usui et al. |
| 6,323,911 B1 | | 11/2001 | Schein et al. |
| 6,384,737 B1 | * | 5/2002 | Hsu et al. ................. 340/825.69 |
| 6,388,714 B1 | | 5/2002 | Schein et al. |
| 6,452,923 B1 | | 9/2002 | Gerszberg et al. |
| 6,466,971 B1 | * | 10/2002 | Humpleman et al. ........ 709/220 |
| 6,469,753 B1 | | 10/2002 | Klosterman et al. |
| 6,490,443 B1 | | 12/2002 | Freeny, Jr. |
| 6,505,348 B1 | | 1/2003 | Knowles et al. |
| 6,510,152 B1 | | 1/2003 | Gerszberg et al. |
| 6,594,688 B2 | | 7/2003 | Ludwig et al. |
| 6,625,665 B1 | * | 9/2003 | McCabe ........................... 710/5 |
| 6,637,029 B1 | | 10/2003 | Maissel et al. |

(Continued)

FOREIGN PATENT DOCUMENTS

EP            1187348          3/2002

(Continued)

*Primary Examiner* — George A Bugg  
*Assistant Examiner* — Bradley E Thompson  
(74) *Attorney, Agent, or Firm* — Carlineo, Spicer & Kee, LLC

(57) ABSTRACT

An apparatus for and method of distributing and reproducing infrared signals within a digital network is disclosed. The apparatus comprises a control unit for digitizing a received infrared signal command from a wireless remote and transmitting the digitized signal over the digital network. The apparatus also-comprises at least one transceiver device coupled to the network and identified by the control unit to receive the digitized signal and reproduce the infrared signal as originally received. The transceiver device can provide the reproduced infrared signal to at least one electronic device located within a vicinity of the transceiver device.

32 Claims, 4 Drawing Sheets

U.S. PATENT DOCUMENTS

| | | |
|---|---|---|
| 6,678,891 B1 | 1/2004 | Wilcox et al. |
| 6,684,399 B1 | 1/2004 | Grooters |
| 6,694,352 B1 | 2/2004 | Omoigui |
| 6,704,028 B2 | 3/2004 | Wugofski |
| 6,721,955 B2 | 4/2004 | Khoo et al. |
| 6,756,997 B1 | 6/2004 | Ward, III et al. |
| 6,804,705 B2 | 10/2004 | Greco et al. |
| 6,865,746 B1 | 3/2005 | Herrington et al. |
| 6,898,762 B2 | 5/2005 | Ellis et al. |
| 7,142,786 B2 * | 11/2006 | Moursund et al. ............ 398/118 |
| 2001/0011296 A1 * | 8/2001 | Chidambaran et al. ....... 709/203 |
| 2001/0042196 A1 * | 11/2001 | Miyano ........................ 712/245 |
| 2002/0081979 A1 | 6/2002 | Okuya et al. |
| 2002/0120932 A1 | 8/2002 | Schwalb |
| 2002/0154024 A1 * | 10/2002 | Stevenson et al. ....... 340/825.22 |
| 2003/0028887 A1 | 2/2003 | Frouin et al. |
| 2003/0034898 A1 | 2/2003 | Shamoon et al. |
| 2003/0052776 A1 | 3/2003 | Richards |
| 2003/0210796 A1 * | 11/2003 | McCarty et al. ................ 381/81 |
| 2003/0224735 A1 * | 12/2003 | Moursund et al. ............. 455/73 |
| 2004/0019908 A1 | 1/2004 | Williams et al. |
| 2004/0208272 A1 * | 10/2004 | Moursund et al. ........... 375/356 |
| 2004/0208599 A1 | 10/2004 | Swartz |
| 2005/0086687 A1 | 4/2005 | Omoigui |
| 2006/0277580 A1 * | 12/2006 | Scheelke ........................ 725/78 |
| 2008/0158001 A1 * | 7/2008 | McCarty et al. ......... 340/825.25 |

FOREIGN PATENT DOCUMENTS

| | | |
|---|---|---|
| WO | WO 00/13344 | 3/2000 |

* cited by examiner

INFRARED SIGNAL DISTRIBUTION AND MANAGEMENT SYSTEM AND METHOD

RELATED APPLICATIONS

This patent application is a continuation in part of U.S. patent application Ser. No. 10/846,332 filed May 14, 2004, having the same title which is hereby incorporated by reference and which itself claims priority from U.S. Provisional Patent Application Ser. No. 60/470,768, filed May 14, 2003, and entitled "DISTRIBUTION AND REPRODUCTION OF INFRARED SIGNALS IN A NETWORK" which is also hereby incorporated by reference.

FIELD OF THE INVENTION

The present invention relates generally to networks for controlling electronic devices. More specifically, the present invention relates to an apparatus for and method of distributing and reproducing infrared signals to control a plurality of remotely located devices within a digital network.

BACKGROUND OF THE INVENTION

Consumer electronic devices are commonly remotely controlled through the use of coded infrared signals. However, the remote controls for these devices typically require a line of sight between the user and the electronic device.

Modern homes contain multiple consumer electronic devices that can benefit from interconnection to other electronic devices in the home, for example, displaying the output of a DVD player located in a living room on a television located in a bedroom. As the number of interoperable electronic devices in the home environment increases, the need arises for a way to control all of the electronic devices in the household remotely and to allow the devices to interact remotely.

A problem encountered when attempting to control multiple electronic devices remotely is that the infrared signal must travel from room to room if the user is in a different room from the device or if multiple devices in different rooms need to be controlled simultaneously. In the past, this problem has been addressed by broadcasting signals and using repeaters to boost the signals in order to reach devices located in a different room from the infrared signal transmitter. Drawbacks to this method include: infrared noise from the environment interfering with the commanded signal, difficulty differentiating between devices of the same make and model, and difficulties arising when more than one user tries to share the same device. In addition, using repeaters for communicating with multiple electronic devices located in more than two rooms creates a broadcast environment where signals feedback and interfere with each other. To accommodate flexibility in accessing and controlling multiple electronic devices, a new apparatus and method is needed for the distribution and reproduction of infrared signals to control remote electronic devices within a home network.

SUMMARY OF THE INVENTION

The present invention discloses an apparatus and method of distributing and reproducing infrared signals within a digital network. The present invention overcomes the drawbacks of broadcasting signals and using repeaters to boost the signals to control electronic devices located in rooms away from a transmitter and receiver unit. The present invention receives an infrared signal command from a wireless remote control, digitizes the received infrared signal, transmits the digitized signal across a digital network, and reproduces the infrared signal as originally received.

In accordance with one embodiment of the present invention, an apparatus for distributing and reproducing infrared signals within a digital network is disclosed. The apparatus comprises a control unit for digitizing a received infrared signal command from a wireless remote and transmitting the digitized signal over the digital network. The apparatus also comprises at least one transceiver device coupled to the network and identified by the control unit to receive the digitized signal and reproduce the infrared signal as originally received.

Preferably, the transceiver device provides the reproduced signal to at least one electronic device located within a vicinity of the at least one transceiver device. At least one transceiver device can be hard wire coupled to the electronic device. The electronic device can include means for establishing a transmissions link with the transceiver device, such as, for example an infra-red transmitter and receiver, a radio frequency antenna, a serial interface or a wired connection. The control unit can include means for establishing a direct transmissions link with any one of the transceiver devices, such as a network interface. The control unit can stagger the sending of two or more control signals to at least one transceiver device to reduce the impact of simultaneously reproducing the control signals. The transceiver device can include means for establishing a direct transmissions link with any one of the at least one transceiver device, such as a network interface.

The digital network can be wired. Alternatively, the digital network can be wireless. The digital network can also be a powerline. A powerline network allows for communications using traditional power lines, by superimposing signal carrier waves on the usual power line electric wave. Examples of powerline networks include the networks defined by the Homeplug Powerline Alliance (see www.homeplug.org). The electronic device can comprise at least one of: a DVD player, a CD player, a cable box receiver, a satellite box receiver, a personal video recorder (PVR), a laserdisc player, a television, a personal computer, a home stereo, a home theater system, a game console, a personal digital assistant (PDA), and a mobile telephone.

In accordance with another embodiment of the present invention, a method of distributing and reproducing infrared signals within a digital network is disclosed. The method includes the step of digitizing a received infrared signal. The method further includes the step of transmitting the digitized signal over the digital network. The method also includes the step of reproducing the infrared signal as originally received. The method can also include the step of sending the reproduced infrared signal to at least one electronic device. The method can also include the step of staggering the sending of two or more control signals to reduce the impact of simultaneously reproducing the control signals. The signal may also be sent multiple times to ensure that the entertainment device receives it.

In accordance with another embodiment of the present invention, an apparatus for distributing and reproducing infrared signals within a digital network is disclosed. The apparatus includes means for digitizing a received infrared signal and transmitting the digitized signal over the digital network. The apparatus also includes means for receiving the digitized signal and reproducing the infrared signal as originally received.

The means for digitizing and transmitting can comprise a control unit. The means for receiving and reproducing can comprise at least one transceiver device. The apparatus can also include means for displaying the reproduced infrared signal as originally received. The means for displaying can include at least one electronic device located within a vicinity of the means for receiving the digitized signal.

In accordance with another embodiment of the present invention, an apparatus for controlling a plurality of electronic devices locatable in at least two rooms within a building and coupled to a digital network is disclosed. The apparatus includes a control unit coupled to the network for digitizing a received infrared signal and transmitting the digitized signal over the network to communicate with a plurality of transceiver devices coupled to the electronic device, thereby establishing a two way communication between the control unit and the transceiver devices, wherein the transceiver devices reproduce the infrared signal as originally received and send the infrared signals to the electronic devices to be controlled.

In accordance with another embodiment of the present invention, a method of controlling a plurality of devices locatable in at least two rooms within a building and coupled over a digital network. The method includes the step of digitizing a received infrared signal. The method further includes the step of transmitting the digitized signal over the network to communicate with a plurality of transceiver devices coupled to the electronic devices. The method also includes the steps of reproducing the infrared signal as originally received; and sending the infrared signal to the electronic devices to be controlled.

In another embodiment of the present invention, an infrared signal distribution and management system for controlling electronic devices is disclosed. The system comprises at least one network IR device coupled to each electronic device to be controlled and an IR management element for accepting commands from a user. The network IR device includes means for emitting coded infrared signals to control the electronic devices, means for being uniquely addressable, and means for addressing each network IR device to communicate signals. The IR management element includes means for emitting the coded infrared signals to control the electronic devices directly, and means for addressing and instructing the network IR device to emit infrared signals to control the electronic devices. The system further includes means for transmitting information between the electronic devices. The means for transmitting can be at least one of a local area network, a wide area network, or a cable network.

According to the preferred embodiment the electronic devices may have identical make and model type, and respond to identical sequences of the coded infrared signals. The network IR devices are preferably comprised of infrared circuitry for sensing infrared activity; infrared circuitry for emitting infrared signals; and network chips for addressing and communicating with the IR management element, each network IR device, and the electronic devices. The IR management element preferably comprises a user interface and microprocessor circuitry for instructing the network IR device to emit the coded infrared signals for controlling the electronic devices.

In accordance with another embodiment of the present invention, a method of distributing and managing infrared signals to control electronic devices is provided. The method comprises the steps of: a) receiving commands from a user through an IR management element; b) sending instructions from the IR management element to network IR devices; c) sending signals between the network IR devices; d) emitting coded infrared signal commands to the electronic devices to be controlled; and e) transmitting information between the electronic devices.

In accordance with another embodiment of the present invention, an infrared signal distribution and management system to control electronic devices is disclosed. The system comprises means for receiving commands from a user through an IR management element and means for sending instructions from the IR management element to network IR devices. The system also includes means for sending signals between the network IR devices. The system further includes means for emitting infrared signal commands from the IR management element and the network IR devices to the electronic devices to be controlled and means for transmitting information between the electronic devices.

In accordance with another aspect of the present invention, a method for controlling an entertainment device is disclosed. A user utilizes a user interface to send an indication of a desired operation. The user interface sends a request that includes the desired operation to a control unit. The control unit processes the request to obtain a control signal. The control signal is sent by the control unit over a digital network to the entertainment device. In a further development, the control signal may be received over the network by a transceiver and sent to the digital entertainment device by the transceiver.

In another further development the user may request a single complex operation. In such a case the control unit intelligently selects multiple control signals which are related to the complex operation. The control unit then sends the multiple control signals to one or more entertainment devices over the network.

In accordance with yet another aspect of the present invention, disclosed is a system for controlling an entertainment device. The system comprises a user interface and a control unit. The user interface receives an indication of a desired operation from a user. It is configured to send a request based on the desired operation to the control unit. The control unit is connected to the user interface and to a digital network, configured to receive the request from the user interface, to process the request in order to obtain a control signal and to send the control signal over the digital network to the entertainment device. The system may further comprise a transceiver connected to the digital network and configured to receive a control signal and send it to an entertainment device.

In a further development the user interface may be further configured to receive an indication of a desired complex operation from the user. The user interface sends a request of the complex operation to the control unit. The control unit is configured to intelligently process the complex operation request in order to derive a plurality of actions which are necessary to fulfill the complex operation.

DETAILED DESCRIPTION OF A PREFERRED EMBODIMENT

Figure 1:
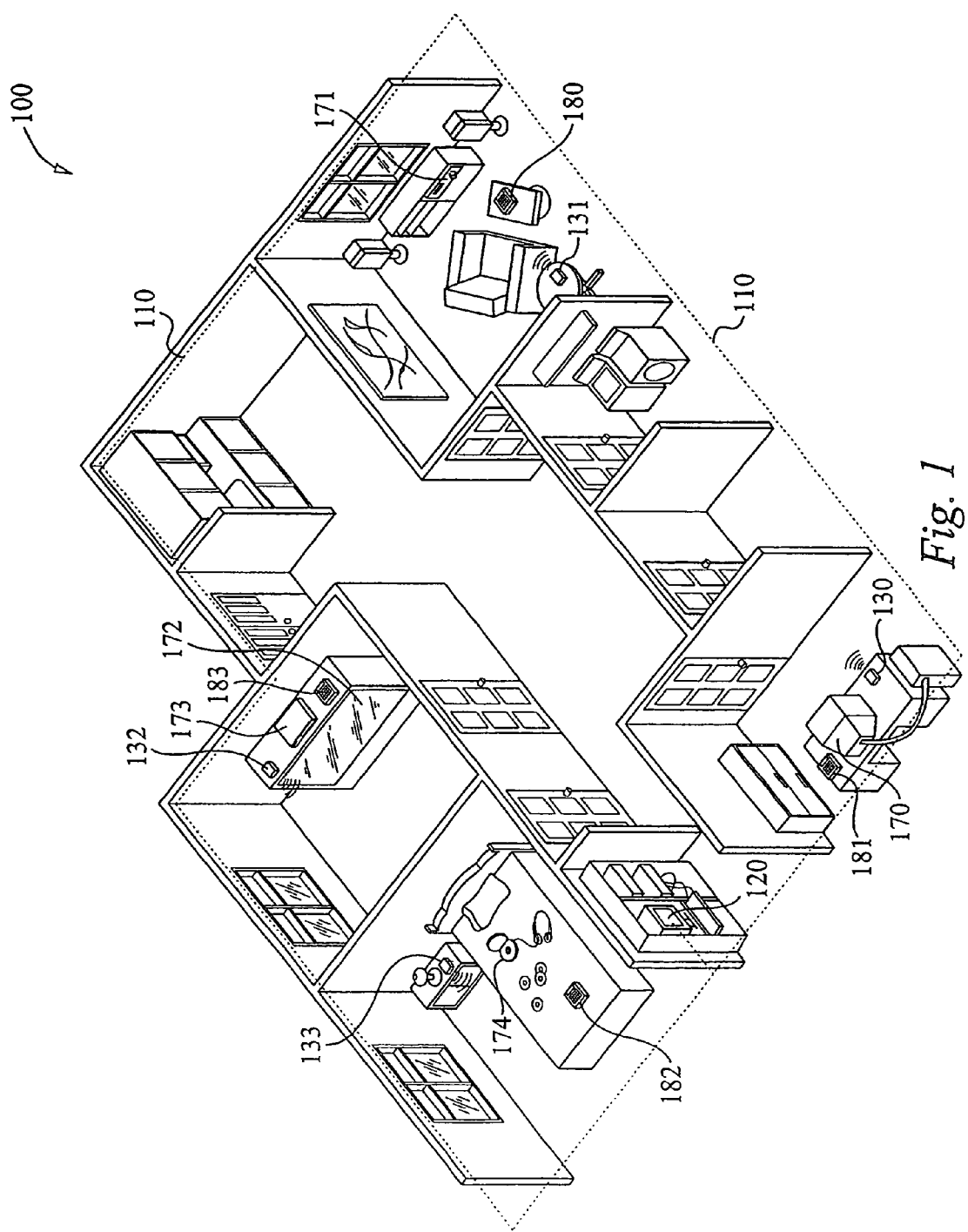
FIG. 1 shows a system for controlling a plurality of electronic devices locatable in at least two rooms within a building and coupled to a digital network in accordance with the present invention.

FIG. 1 illustrates a system according to the present invention for controlling a plurality of electronic devices locatable in at least two rooms within a building and coupled to a digital network. The system 100 includes a network 110, an IR management element or control unit 120, and a plurality of IR network devices or transceiver devices 130, 131, 132 and 133. The system 100 controls a plurality of electronic devices 170, 171, 172, 173 and 174 according to commands from a user with a wireless remote. FIG. 1 shows an example with four rooms included in the system 100. In this example, the electronic device 170 is personal computer. The electronic device 171 is a home stereo. The electronic devices 172 and 173 are a television and cable box receiver, respectively. The electronic device 174 is a CD player. A plurality of IR interface devices 180, 181, 182 and 183 are operated by a user to request an action by one of the electronic devices 170-174. The IR interface devices 180-183 can each be a unique so-called "clicker" provided by the manufacturer of each of the electronic devices 170-174. However, preferably the IR interface devices 180-183 are universal devices configured to operate in the system of the present invention.

When a user chooses to remotely control one or more of the plurality of electronic devices 170 to 174 remotely, the user enters a command from one of the IR interface devices 180-183 to the control unit 120. The control unit 120 digitizes the infrared signal and transmits the digitized signal over the network 110. In one embodiment, the control unit 120 identifies an appropriate transceiver device 130-133 for receiving the digitized signal located in the same room or zone of the electronic device 170-174 to be controlled. Each transceiver device 130-133 is capable of receiving digitized signals, reproducing the infrared signal as originally received, and providing the reproduced signal to at least one electronic device 170-174 located within a vicinity of the appropriate transceiver device 130-133. Alternatively, the control unit 120 can emit the infrared signal directly to an electronic device when the electronic device to be controlled is located in the same room or zone of the control unit 120.

The network 110 couples the control unit 120 and the plurality of transceiver devices 130-133 in the system 100 to enable communication between them; signals or information can be sent between the control unit 120 and the plurality of transceiver devices 130-133 and also between the transceiver devices 130-133. For example, if the control unit 120 fails, the transceiver devices 130-133 can communicate between themselves with information preprogrammed by the control unit 120 in advance of failure. The network 110 can be wired. Alternatively, the network 110 can be wireless. The network 110 can also be a powerline.

In a preferred embodiment, each of the transceiver devices 130-133 can be individually addressable and distinguishable from any other transceiver device 130-133 with use of network protocols, so that when the digitized signal is transmitted over the network 110, only the selected transceiver device 130-133 responds. In a preferred embodiment, when the control unit 120 receives and digitizes a received infrared signal from a user with an IR interface device 180-183, the control unit 120 intelligently identifies and decides which transceiver device 130-133 shall receive the digitized signal, reproduce the infrared signal as originally received and send the reproduced infrared signal to the electronic device as requested by the user. Thus, the control unit 120 sends electronic instructions over the network 110 to the appropriate transceiver device or devices 130-133 to control the electronic device or devices 170-174 selected by the user using appropriate protocols.

The control unit 120 can also stagger sending control signals to each transceiver device 130-133 by a predetermined time period to ensure that the signals are properly received. For example, if a first user requests to control the stereo 171 from the room where the stereo 171 is located and a second user, simultaneously, requests to control the stereo 171 from a remote location, the control unit 120 will stagger sending the signals to the transceiver device 132 and would not reproduce simultaneous control requests. The staggering of the control signals will be performed by delaying some of the control signals when sending them over the network to the transceivers 130-133, so that the signals are sent sequentially.

The IR receivers of many entertainment devices are not able to receive IR signals in immediate succession. Most such IR receivers require some time to reset after receiving a first control signal before they are able to receive another one. Therefore, the present invention provides that successive signals sent out by a single transceiver are separated in time by at least a minimum interval which would allow the usual entertainment device IR receiver to reset. This time delay may be performed by the controller by ensuring that control signals are sent over the network to the transceivers in controlled intervals. Alternatively, the time delay may be controlled by the transceivers which may buffer signals received from the control unit and transmit them after the appropriate delays.

The present system preferably provides that the user sends signals (usually IR signals) to a transceiver, the transceiver communicates with the control unit and upon instructions from the control unit the transceiver sends IR signals to the entertainment devices. It can be seen that in this case there are at least two devices that are sending IR signals, the transceivers and the remote controls 180-183 utilized by the users to communicate with the transceivers. Furthermore, it is possible that the users may use the native remote controls for the entertainment devices as well thus causing three or more devices to send IR signals at the same time. While the present invention is intended to replacing the functionality of such native remote controls, it is still possible that the user may use them out of confusion. Entertainment devices usually cannot handle multiple IR signals at the same time and usually fail to detect any of the signals if multiple signals are directed at them at the same time.

Therefore, embodiments of the present invention feature the ability to ensure that the IR signals transmitted by the transceivers 130-133 are not overlapped by any other IR signals. Specifically, the transceivers detect if they are receiving any IR signals (including any IR signals that are not intended for the transmitters), and if they are they do not transmit any such signals. If a transceiver receives a command from the control unit to send out an IR signal but is, at that time, receiving an IR signal the transceiver may buffer the command and delay its performance until a later time when it is no longer receiving IR signals. Alternatively, the transceiver may send back an error message to the control unit, and the control unit may repeat the command at a later time. In another alternative, the transceiver may proceed to send a first IR signal as usual even when it detects that another external IR signal is being sent. However, the transceiver would then repeat the first IR signal until the signal can be sent at a time when no external signals are detected.

To further ensure that the entertainment devices receive the signals from the transceivers, embodiments of the present invention may provide that the transceivers send each signal multiple times. For example each signal may be sent twice or three times in a quick succession to ensure that the entertainment device receives it. Many entertainment devices are configured to allow the quick successive repetition of IR commands and do not to treat such repetition as multiple commands. This is the case, because many IR remote controls cause a command to be repeated if a user holds a remote control button down for a long time. Thus, repeating the control signal multiple times in quick succession may ensure that the signal is received even if there is some partial interference which obscures one or more of the repetitions.

In another embodiment, in order to ensure that the repetition does not cause adverse results, such signal repetition is only performed for stateless commands, i.e. commands that would have the same effect regardless of the current state of the entertainment device. An example of a stateless command is the command to switch to a particular channel—it produces the same results regardless of what the current channel is. In this embodiment, state dependent commands, such as, for example, volume up/down, channel up/down are not repeated.

The transceiver devices 130-133 comprise infrared circuitry (not shown) for sensing infrared activity and emitting infrared-signals. The transceiver devices 130-133 also comprise network circuitry (not shown) for addressing and communicating with the control unit 120 and with any other transceiver device 130-133. As mentioned, the transceiver device 130-133 preferably receive instructions from the control unit 120 and send appropriate signals to operate the electronic device 170-174 selected according to commands from the user. A benefit of having each individual transceiver device 130-133 configured to be individually addressed, allows for multiple electronic devices of the same make and model to be controlled within the system 100. Thus, in FIG. 1, the transceiver device 130 can provide a requested infrared signal command to control the computer 170; the transceiver device 131 can provide a requested infrared signal command to control the home stereo 171; the transceiver device 132 can provide a requested infrared signal command to control the television 172 and/or the cable box receiver 173; and the transceiver device 133 can provide a requested infrared signal command to control the CD player 174, whether the user requesting that operation is located in the same room or another room.

Figure 2:
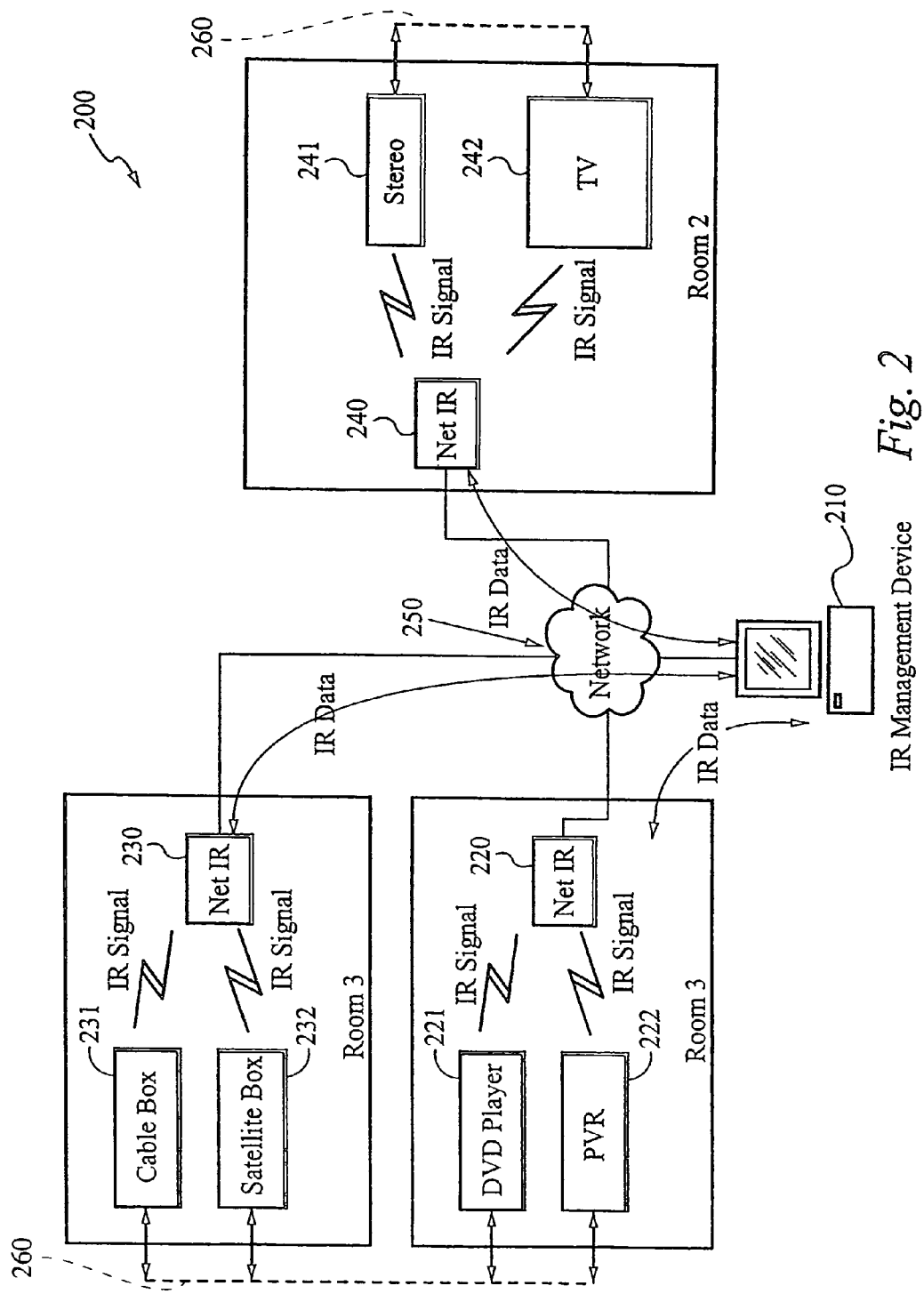
FIG. 2 is a block diagram of an apparatus for distributing and reproducing infrared signals within a digital network in accordance with the present invention.

FIG. 2 is a block diagram of an apparatus 200 for distributing and reproducing infrared signals within a digital network in accordance with one embodiment of the present invention. A control unit 210 accepts user input signals from a wireless remote (which may utilize IR, radio waves, or any other wireless medium) and distributes the signals in digitized form to control a plurality of transceiver devices 220, 230 and 240 and electronic devices 221, 222, 231, 232, 241 and 242 coupled to a digital network 250. The control unit 210 communicates with the transceiver devices 220, 230, 240 that are coupled to the network 250, as shown. Each transceiver device 220, 230, 240 is coupled to control at least one electronic device, as shown. For example, the transceiver device 220 controls and is coupled to the electronic devices 221 and 222. The transceiver device 230 controls and is coupled to the electronic devices 231 and 232. The transceiver device 240 controls and is coupled to the electronic devices 241 and 242. The control unit 210 preferably determines which transceiver device is coupled to which electronic device or devices that the user wants to control. The control unit 210 then transmits a signal or signals to the transceiver device that is coupled to the electronic device to be controlled. Note that the number of electronic devices each transceiver device can control is not limited to two electronic devices, as shown in FIG. 2. The apparatus 200 can include an unlimited number of transceiver devices and electronic devices. The control unit 210 is also capable of directly emitting infrared signals directly to any electronic device located within a same room or vicinity as the control unit 210. The control unit 210 can be aimed to have its IR signal point toward the transceiver device 220, 230 and 240 of the selected electronic device 221, 222, 231, 232, 241 and 242. Alternatively, a fibre optic cable can deliver the IR signal directly into the transceiver device 220, 230 and 240. Preferably, the control unit 210 can drive an IR LED mounted to the transceiver device 220, 230 and 240 of the electronic device 221, 222, 231, 232, 241 and 242. Further, if an electronic device 221, 222, 231, 232, 241 and 242 needs to interact with any other electronic device 221, 222, 231, 232, 241 and 242 or devices in the network 250, audio, video, and data signals can be sent along a signal bus 260 that is coupled to all of the electronic devices 221, 222, 231, 232, 241 and 242.

The signal bus 260 couples outputs of any of the plurality of electronic devices 221, 222, 231, 232, 241 and 242. The signal bus can be an electrical transmission cabling such as a coaxial cable or optical transmission cabling, including a fiber optic cable, that carries and distributes network signals such as audio, video, and data signals. The transmission cabling can be same as cabling used for the network for communication between the control unit 210 and the transceiver devices 220, 230 and 240. The signal bus allows any of the plurality of electronic devices 221, 222, 231, 232, 241 and 242 to operate in conjunction with any other of the plurality of electronic devices 221, 222, 231, 232, 241 and 242 when "dual electronic device operation" is needed. For example, if a user requests that an output of a DVD player 221 be displayed on a television 242, the DVD player 221 can transmit the output through the signal bus 260 to the television 242. The control unit 210, in this example, can command a first transceiver device 220 to provide the infrared signal to control the DVD player 221 to turn on, play a DVD, and transmit the DVD output to the signal bus 260, while simultaneously commanding a second transceiver device 240 to turn the television 242 on and display the output generated by the DVD player 221. The system, therefore, allows a user to remotely control multiple electronic devices that respond to infrared signals without the need for the user to be physically present in the same room as the device to be controlled.

Figure 3:
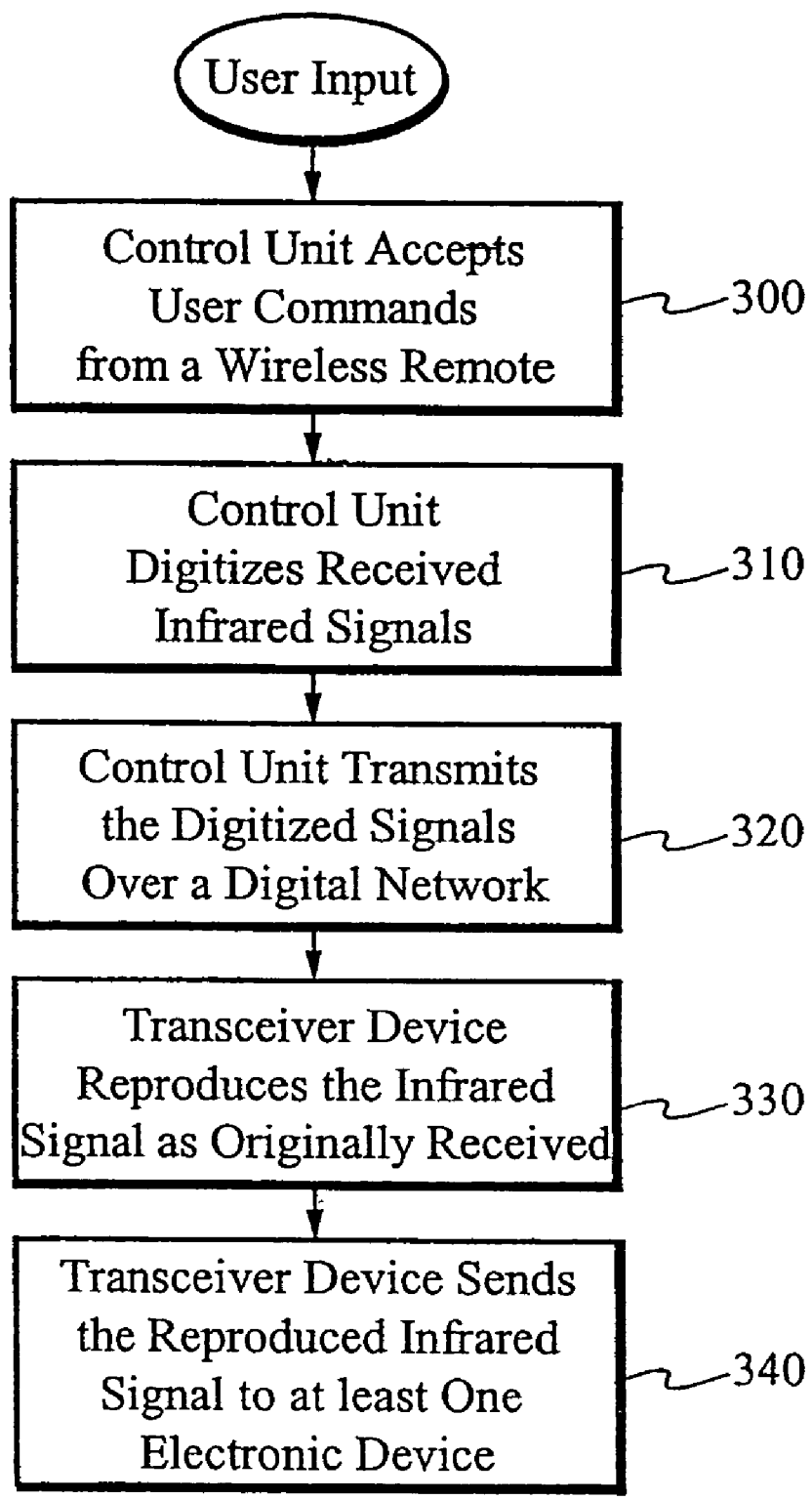
FIG. 3 is a flow chart illustrating a method of distributing and reproducing infrared signals within a digital network in accordance with the present invention.

FIG. 3 is a flow chart illustrating a method of distributing and reproducing infrared signals within a digital network in accordance with the present invention. In the step 300 a control unit receives user commands from a wireless remote. The user commands are preferably infrared signals. Next, in the step 310, the control unit digitizes the received infrared signals and, in step 320, transmits the digitized signals over a digital network. The digital network can be wired. Alternatively, the digital network can be wireless. The digital network can also be a powerline. Next, in the step 330, a transceiver device receives the digitized signals and reproduces the infrared signals as originally received. Preferably, each of the transceiver devices coupled to the network is uniquely addressable and thus distinguishable from any other transceiver device in the network. Preferably, the transceiver devices each reside in the same room or location as one or more electronic, devices to be controlled. The electronic devices can comprise a DVD player, a CD player, a cable box receiver, a satellite box receiver, a personal video recorder (PVR), a laserdisc player, a personal computer, a home stereo, a home theater system, a game console, a personal digital assistant (PDA), and a mobile telephone. In the step 340, the transceiver device appropriately selected by the control unit sends the reproduced infrared signal to the electronic device to be controlled. Thus, the infrared signals from the user are transmitted by the control unit to the transceiver device that is closest to receiving and then sending the infrared signals to a particular electronic device to be controlled. Multiple commands may be sent by the control unit to multiple transceiver devices to control multiple electronic devices. The control unit and the transceivers may also stagger and delay signals as discussed above in order to avoid overlapping signals and to allow the receivers of the entertainment devices sufficient time to reset after each received signal.

The electronic devices can transmit signals to one another to implement the user's commands. For example, an electronic device can directly transmit audio, video, or data signals along a signal bus for use by another electronic device on the network. Instead of a bus, the electronic devices may transmit signals over a network. This may be network 250 through which the control signals are transmitted (see FIG. 2) or it may be a different network. If the electronic devices are not configured for network communications additional devices may be used as bridges to connect the electronic devices to the network.

In an alternative embodiment, the does not directly accept user commands from a wireless remote. Instead, the transceiver receives the user commands from a wireless remote. Preferably, the wireless remote is an IR remote. The transceiver then converts the user commands to format suitable for sending over a digital network. For example, the transceiver may convert the commands into electrical signals, digitize the electrical signals and organize them in a format in accordance with a network communications protocol (i.e. TCP/IP). The transceiver then sends the user commands to the control unit over the network.

Alternatively, a distinct IR receiver may receive the user commands. However, it is preferred that the user commands be received from the transceiver which also sends command signals to the electronic devices. In other words, it is preferred that the IR receiver be part of the transceiver or that they are the same device. This would reduce the number for network capable devices necessary for the present system.

Figure 4:
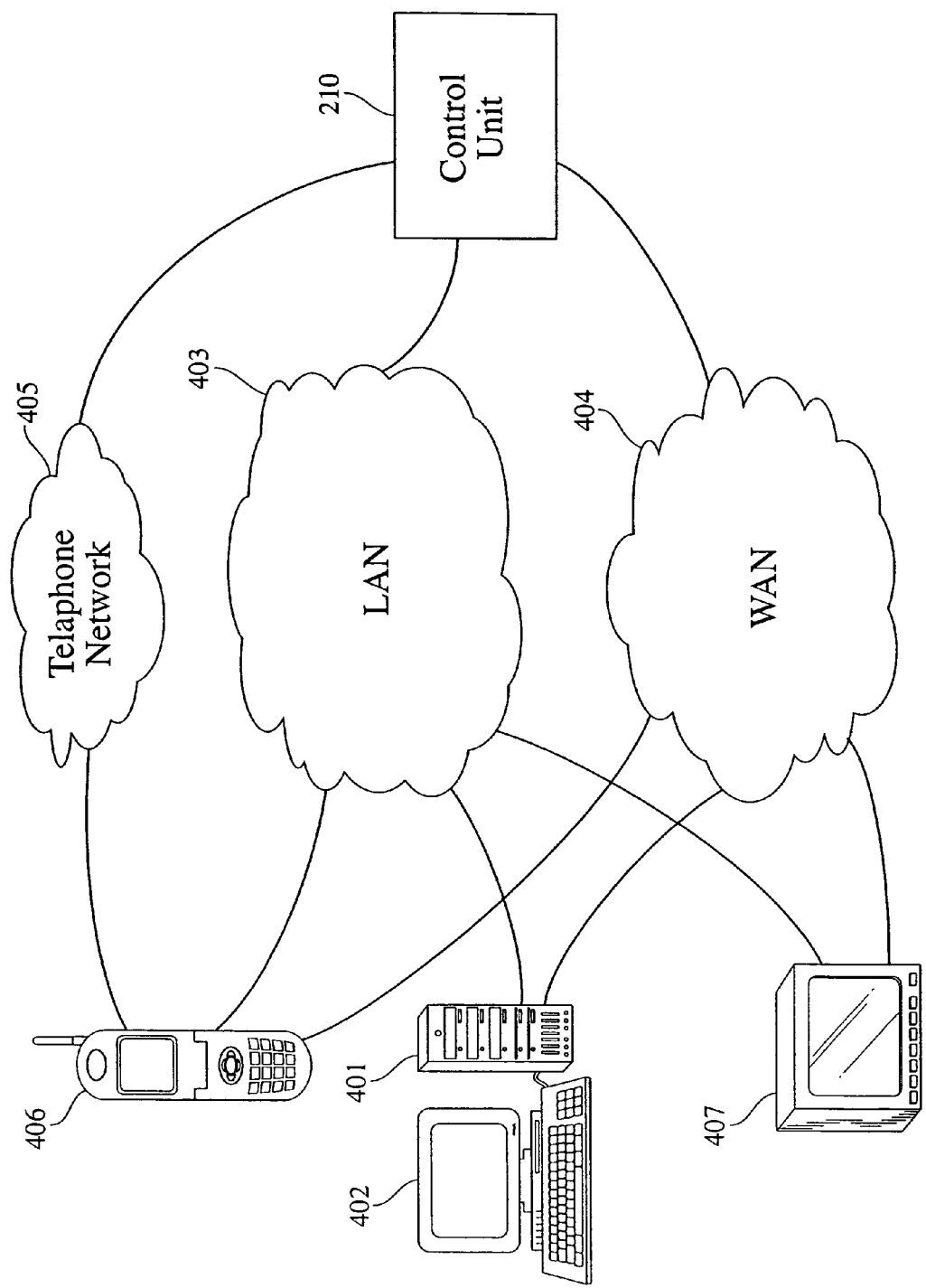
FIG. 4 is a diagram of several alternative schemes of sending user commands to a control unit.

In alternative embodiments the user may utilize different devices to send commands to the control unit 210. For example, referring to FIG. 4, the user may use suitable software loaded and executed at a generally programmable computer 401. The software may implement a user interface 402 which the user interacts with in order to issue commands to the control unit 210. The software may connect to the control unit through a local area network 403 or a wide area network 404. The wide area network may be the Internet. Thus, the computer 401 and the user may be local to the control unit (i.e. in the same apartment) or remote from it. The computer 401 may be the same computer as the one shown implementing the control unit 210 in FIG. 2 (in such a case the control unit and the user interface would be differentiated by the different pieces software which implement these two functions). Alternatively, the computer 401 may be distinct from the control unit 210, as shown in FIG. 4. It is however, preferable that the user communicates with the control unit through the transceivers as discussed above.

In an additional development, the software running on the computer 401 and implementing the user interface 402 may be provided to the computer 401 by the control unit 210 or another server over one of the networks 403, 404. This would allow the user to utilize computers which do not necessarily have the user interface software preloaded, i.e. computers in public kiosks, libraries etc. Furthermore, the user interface may be provided by utilizing standard software, such as a web-browser. In this case the control unit 210 may serve as a web server. The computer 401 may be portable. It may also be wirelessly connected to one of the networks 403, 404.

The interface may also be implemented as software executing on a cellular telephone 406. The telephone may connect to the control unit 210 to send user commands directly through a telephone network 405 or through a combination of the telephone network 405, WAN 404, and/or LAN 403.

The interface may also be implemented on a wireless radio frequency device 407. The wireless radio frequency device maybe a general purpose device which executes software implementing the user interface, or it may be a custom device which customized hardware alone or in combination with software to implement the function. The wireless radio frequency device may communicate with the control unit through direct radio connections as well as through a wireless network, such as for example a wireless version of LAN 403.

Embodiments of the present invention may ease the user's control over the various entertainment devices by allowing the user to easily invoke complex operations. Complex operations are operations that require multiple control signals to be sent to one or more entertainment device in order to execute the operation. It is preferable that the user is able to invoke complex operations quickly and easily, preferably by making a single selection at the user interface.

An example of a complex operation may be setting all television sets of a house to a single channel and setting the volume of all television sets to a single level. This requires sending multiple commands to multiple television sets. It may also require sending commands to various other devices, such as Cable box 231 and Satellite Box 232 in order to forward the necessary media stream to the multiple television sets.

The control unit may store the definitions of a plurality of complex operations in its memory. The definitions of each complex operation should include a sequence of commands which must be sent to various devices in order to execute the complex operation. The definitions may be specified by the manufacturer of the present invention. In addition, new definitions may be added by the user.

When the user selects a complex operation, the control unit 210 determines retrieves a list of commands which are associated with the complex operation in that complex operation's definition. The control unit then sends the commands to the appropriate devices.

Additionally, the control unit 210 may use additional information to determine what commands must be sent to the various devices. The control unit may, for example access program listings. Thus, a user may request that a particular show be recoded. The control unit may access listings of available media channels, and determine at what time, which channel, and from which device the requested show is available. The control unit may then send the necessary commands to one or more devices in order to ensure that the show is recorded.

This invention has been described in terms of specific embodiments incorporating details to facilitate the understanding of the principles of construction and operation of the invention.

Such reference herein to specific embodiments and the details thereof is not intended to limit the scope of the claims appended hereto. It will be apparent to those of ordinary skill in the art that modifications can be made in the embodiment chosen for illustration without departing from the spirit and scope of the invention.

What is claimed is:

1. A method for controlling a plurality of entertainment devices, the method comprising:
   receiving, by a control unit, a single request for a complex operation from a user device, wherein the complex operation is implemented on a first entertainment device and a second entertainment device;
   processing, by the control unit, the single request to obtain a plurality of commands associated with the complex operation from memory operably coupled to the control unit;
   generating, by the control unit, a first control signal and a second control signal based on the obtained plurality of commands;
   determining, by the control unit, a first transceiver based on a first location corresponding to the first entertainment device;
   determining, by the control unit, a second transceiver based on a second location corresponding to the second entertainment device;
   sending, by the control unit, the first control signal over a digital network to the first transceiver; and
   sending, by the control unit, the second control signal over the digital network to the second transceiver.

2. The method of claim 1, wherein the sending the first control signal by the control unit step further comprises:
   receiving, by the first transceiver, the first control signal via the digital network; and
   sending, by the first transceiver, the first control signal to the first entertainment device.

3. The method of claim 2, further comprising:
   receiving an infrared user request signal at an infrared receiver;
   converting the infrared user request signal to a non-infrared format associated with the digital network; and
   sending the converted user request signal from the infrared receiver to the control unit via the digital network.

4. The method of claim 3, wherein the infrared receiver and the first transceiver are the same device.

5. The method of claim 2, wherein the sending, by the first transceiver, the first control signal step further comprises converting the first control signal into a format associated with the first entertainment device.

6. The method of claim 5, wherein the converting the first control signal step further comprises converting an electrical signal into an infrared signal and the sending the control signal by the first transceiver step further comprises sending the infrared signal to the first entertainment device.

7. The method of claim 6, wherein the sending of the first control signal by the first transceiver step further comprises sending the same infrared signal to the first entertainment device multiple times.

8. The method of claim 6, wherein the sending of the infrared signal further comprises selectively delaying the infrared signal so that no less than a predefined minimum time elapses between the sending of the infrared signal and the sending of a previously transmitted infrared signal.

9. The method of claim 6, wherein the sending of the infrared signal comprises detecting an external infrared signal by the first transceiver, and in the event an external infrared signal is detected, delaying the sending of the infrared signal until no external infrared signal is present or resending the infrared signal when no external infrared signal is present.

10. The method of claim 1, wherein the user device is a general purpose computer executing software which implements a user interface, the general purpose computer being connected to the control unit.

11. The method of claim 10, wherein the general purpose computer is connected to the control unit through a second network.

12. The method of claim 11, wherein the second network is the Internet.

13. The method of claim 1, wherein the user device is a cellular phone, and the receiving a single request is performed over a wireless network.

14. The method of claim 1, wherein the user device is a portable electronic device and the receiving a single request is performed over a wireless network.

15. The method of claim 1 wherein the processing step further includes the step of accessing additional information by the control unit and wherein the control signal is at least partially based on the additional information.

16. A system for controlling a plurality of entertainment devices, the system comprising:
   a user interface for receiving an indication of a desired complex operation from a user and configured to send a single request based on the desired complex operation;
   a control unit connected to the user interface and to a digital network, configured to receive the single request from the user interface, to process the single request in order to obtain a plurality of commands associated with the complex operation from memory operably coupled to the control unit, to generate a plurality of control signals based on the commands, to determine a plurality of transceivers based on locations corresponding to the plurality of entertainment devices, and to send the control signals over the digital network to the plurality of transceivers.

17. The system of claim 16, further comprising:
   a first transceiver connected to the digital network and configured to receive a first control signal from the control unit and to send the received first control signal to a first entertainment device.

18. The system of claim 17, further comprising an infrared receiver and wherein
   the user interface is an infrared remote control configured to send an infrared user request signal comprising the single request to the infrared receiver; and
   the infrared receiver is configured to receive the infrared user request signal, to convert the user request signal to a format associated with the digital network, and to send the converted user request signal from the infrared receiver to the control unit through the digital network.

19. The system of claim 18, wherein the infrared receiver is part of the first transceiver.

20. The system of claim 17, wherein the first transceiver is further configured to convert the first control signal into a format associated with the first entertainment device.

21. The system of claim 20, wherein the first transceiver is further configured to convert an electrical signal into an infrared signal and send the infrared signal to the first entertainment device.

22. The system of claim 21, wherein the first transceiver is further configured to send the same infrared signal to the first entertainment device multiple times.

23. The system of claim 21, wherein the first transceiver is further configured to selectively delay the sending of the infrared signal so that no less than a predefined minimum time elapses between the sending of the infrared signal and the sending of a previously transmitted infrared signal.

24. The system of claim 21, wherein the first transceiver is further configured to detect an external infrared signal, and in the event an external infrared signal is detected, delay the sending of the infrared signal until no external infrared signal is present, or resend the infrared signal when no external infrared signal is present.

25. The system of claim 16, wherein the user interface is implemented by a general purpose computer comprising executable software, the general purpose computer being connected to the control unit.

26. The system of claim 25, wherein the general purpose computer is connected to the control unit through a network.

27. The system of claim 26, wherein the network is the Internet.

28. The system of claim 16, wherein the user interface is a cellular phone, and the sending the single request is performed over a wireless network.

29. The system of claim 16, wherein the user interface is a portable electronic device and the sending the single request is performed over a wireless network.

30. The system of claim 16, wherein the control unit includes a storage, wherein the storage comprises additional information and the control unit is further configured to access the additional information when processing the request in order to obtain the plurality of control signals.

31. The method of claim 1, wherein sending the first control signal over the digital network to the first transceiver comprises:
   determining, by the control unit, that the first control signal corresponds to a stateless command included in the plurality of commands;
   sending, by the control unit, the first control signal over the digital network to the first transceiver; and
   repeating, by the control unit, the sending of the first control signal to the first transceiver at least one time.

32. The method of claim 31, wherein sending the second control signal over the digital network to the second transceiver comprises:
   determining, by the control unit, that the second control signal corresponds to a state dependent command included in the plurality of commands; and
   sending, by the control unit, the second control signal over the digital network to the second transceiver a single time.

* * * * *